US012485060B2

(12) United States Patent
Wang

(10) Patent No.: US 12,485,060 B2
(45) Date of Patent: Dec. 2, 2025

(54) MASSAGER WITH MULTIPLE MASSAGE MODES

(71) Applicant: Dongguan Hongxiang Electronic Technology Co., Ltd., Guangdong (CN)

(72) Inventor: Qinduo Wang, Guangdong (CN)

(73) Assignee: Dongguan Hongxiang Electronic Technology Co., Ltd., Dongguan (CN)

( * ) Notice: Subject to any disclaimer, the term of this patent is extended or adjusted under 35 U.S.C. 154(b) by 0 days.

(21) Appl. No.: 19/037,334

(22) Filed: Jan. 27, 2025

(65) Prior Publication Data

US 2025/0248888 A1 Aug. 7, 2025

(30) Foreign Application Priority Data

Feb. 2, 2024 (CN) ......................... 202420269233.0
Feb. 5, 2024 (CN) ......................... 202420279108.8
Jan. 23, 2025 (CN) ......................... 202520156600.0

(51) Int. Cl.
*A61H 19/00* (2006.01)
*A61H 23/02* (2006.01)

(52) U.S. Cl.
CPC ............. *A61H 19/34* (2013.01); *A61H 19/44* (2013.01); *A61H 23/0254* (2013.01); *A61H 2201/149* (2013.01); *A61H 2201/1654* (2013.01); *A61H 2201/1669* (2013.01); *A61H 2201/1676* (2013.01)

(58) Field of Classification Search
CPC ................................ A61H 19/34; A61H 19/44
See application file for complete search history.

(56) References Cited

U.S. PATENT DOCUMENTS 11,771,619 B1 * 10/2023 Yan ........................ A61H 19/44 600/38
12,011,409 B1 * 6/2024 Wang ..................... A61H 19/40
12,064,386 B1 * 8/2024 Yan ........................ A61H 23/02
2016/0120737 A1 * 5/2016 Sedic ................. A61H 23/0263 601/46
2018/0289585 A1 * 10/2018 Murison ................ H02K 7/003
2021/0393475 A1 * 12/2021 He ......................... A61H 19/34
2023/0310262 A1 * 10/2023 Crozier .................. A61H 19/50 600/38

* cited by examiner

*Primary Examiner* — Thaddeus B Cox

(57) ABSTRACT

A massager with multiple massage modes includes a fixed part, a first massage part arranged at a front end of the fixed part, and a second massage part arranged at a side of the fixed part. A driving assembly for driving the first massage part and the second massage part to simultaneously move is arranged inside the fixed part. The driving assembly includes a driving motor, a first transmission component and a second transmission component, the driving motor is configured to drive the first massage part to move via the first transmission component and drive the second massage part to move via the second transmission component; and the first massage part is configured for inserting into a vagina or anus for massage, and the second massage part is configured for external massage.

19 Claims, 4 Drawing Sheets

MASSAGER WITH MULTIPLE MASSAGE MODES

CROSS-REFERENCE TO RELATED APPLICATIONS

The present application claims priorities of Chinese Patent Application No. 202420279108.8, filed on Feb. 5, 2024, Chinese Patent Application No. 2025201566000, filed on Jan. 23, 2025, and Chinese Patent Application No. 202420269233.0, filed on Feb. 2, 2024, the entire contents of which are hereby incorporated by reference.

TECHNICAL FIELD

The present disclosure relates to the technical field of massagers, in particular to a massager with multiple massage modes.

DESCRIPTION OF THE PRIOR ART

A massager is a device that that uses mechanical, electronic, or pneumatic methods or the like to produce vibrations, kneading, Chinese massage, or hot compress among others to massage specific areas of the human body. It aims to relieve muscle fatigue, promote blood circulation, reduce body pain, and relax the body and mind for health maintenance or auxiliary therapy. It can provide a more comprehensive, flexible, and hand-like massage experience to meet the massage needs of different body areas. For example, a handheld massager is usually small in size, easy to carry, and comes with various massage head shapes and movement modes that simulate the kneading action of the human hand.

However, existing massagers either have a single function, or although they may have multiple functions, their structure is complex, and the cost is high. This goes against the development principles of modern manufacturing. It is challenging to achieve multifunctional massage capabilities while ensuring compact size and low cost. As a result, they often fail to meet practical user needs.

In view of this, the inventor provides a massager with multiple massage modes.

SUMMARY OF THE DISCLOSURE

The present disclosure aims to provide a massager with multiple massage modes to solve the problems of the prior art.

To achieve the above-mentioned purpose, the present disclosure provides a massager with multiple massage modes, including a fixed part, and further including:

- a first massage part arranged at the front end of the fixed part, and a second massage part arranged at the side of the fixed part. A driving assembly is arranged inside the fixed part, and the driving assembly is used to drive the first massage part and the second massage part to move at the same time.

The driving assembly includes a driving motor, a first transmission component and a second transmission component. The driving motor drives the first massage part to move through the first transmission component, and the driving motor drives the second massage part to move through the second transmission component.

According to the above technical solution, the driving motor drives the first massage part to rotate through the first transmission component, and the driving motor can also simultaneously drive the second massage part to swing through the second transmission component. In particular, while the driving motor drives the first massage part to perform rotational swing, it can also synchronously drive the second massage part to perform a reciprocating swinging motion. Compared with the prior art, the two massage modes are carried out simultaneously, which is more suitable for practical user needs. Therefore, the massager of the present disclosure has stronger adaptability.

Furthermore, the first massage part and the second massage part are each provided with a vibration motor, and the outer walls of the fixed part, the first massage part and the second massage part are all wrapped with flexible protective covers.

Flexible protective covers can achieve a waterproof effect, and the fixed part, the first massage part and the second massage part can move independently without affecting the movement of each other.

Furthermore, the first transmission component includes a transmission shaft, a bent rod is provided at the front end of the transmission shaft, a drive collar is provided inside the first massage part, the bent rod extends into the drive collar, the end of the bent rod away from the transmission shaft is structurally matched with the drive collar, the driving motor is located inside the fixed part, the end of the transmission shaft away from the bent rod is in transmission connection with the output end of the driving motor, and a control switch is provided on the top of the fixed part.

Furthermore, the second transmission component includes a protruding part and an arc-shaped toggle plate, the protruding part is arranged on a side of the transmission shaft close to the driving motor, the arc-shaped toggle plate is arranged inside the second massage part, a limiting shaft is arranged in the middle of the arc-shaped toggle plate, the arc-shaped toggle plate is rotatably connected to the inner wall of the fixed part through the limiting shaft, and a limiting slide bar is arranged at the bottom of the arc-shaped toggle plate.

Furthermore, a reciprocating push rod is arranged inside the fixed part, a slide groove is opened on the top of the reciprocating push rod, the limiting slide bar is located in the slide groove, and the limiting slide bar is slidably engaged with the slide groove.

Furthermore, a drive groove is opened on the bottom of the reciprocating push rod, and the slide groove and the drive groove are arranged at an angle of 90°. The protruding part passes through the drive groove, and the protruding part is slidably engaged with the drive groove.

According to the above technical solution, when the driving motor drives the flexible first massage part to rotate and swing for massage, it can also drive the reciprocating push rod to move up and down through the protruding part. Since the limiting slide bar is slidably fitted with the slide groove, the limiting slide bar can be driven to move. Moreover, since the arc-shaped toggle plate is rotatably connected to the inner wall of the fixed part through the limiting shaft, as the limiting slide bar is reciprocally driven, it causes the arc-shaped toggle plate to perform reciprocating rotation around the limiting shaft as the center, thereby driving the second massage part to perform reciprocating swing and achieving the effect of reciprocating swing massage.

Furthermore, a rotating member is rotatably connected in the fixed part, the center of the rotating member is in transmission connection with the transmission shaft, a swing rod is rotatably connected to an end of the fixed part close to the first massage part, an eccentric post is eccentrically arranged at an end of the rotating member away from the transmission shaft, a swing groove structurally matching with the eccentric post is opened at an end of the swing rod close to the rotating member, and an end of the swing rod away from the fixed part is fixedly connected to the first massage part.

According to the above technical solution, the driving motor drives the rotating member to rotate through the transmission shaft, and thus drives the eccentric post to rotate, thereby driving the swing rod to swing back and forth, and thus driving the first massage part as a whole to perform up-and-down swing massage.

Furthermore, a battery is provided in the first massage part, a slider is slidably connected in the fixed part, one end of the slider is connected to the driving motor, and the other end of the slider is fixedly connected to the first massage part.

Furthermore, the slider is in transmission connection with the driving motor, the driving motor is used to drive the slider to move back and forth, and a control board for controlling the driving motor is arranged in the fixed part.

According to the above technical solution, the battery is used to supply power to the driving motor, and the control board is used to control the rotation mode of the driving motor.

Furthermore, an L-shaped push rod is rotatably connected in the second massage part, the bottom of the L-shaped push rod is hinged to one end of the slider, and the top of the L-shaped push rod is connected to the vibration motor in the second massage part.

According to the above technical solution, the driving motor drives the slider to move back and forth, thereby driving the first massage part to perform telescopic massage. At the same time, the second massage part can be driven to swing through the L-shaped push rod, and the vibration motors on the first massage part and the second massage part can further enhance the massage effect.

Compared with the prior art, the benefits of the present disclosure are explained as follows.

In the present disclosure, the driving motor drives the first massage part to move through the first transmission component, and the driving motor can also simultaneously drive the second massage part to swing through the second transmission component. In particular, while the driving motor drives the first massage part to move, it can also synchronously drive the second massage part to perform a reciprocating swinging motion. Compared with the prior art, the two massage modes are carried out simultaneously, which is more suitable for practical user needs. Therefore, the massager of the present disclosure has stronger adaptability. Moreover, it features a simple structure, compact size, and is less prone to damage, with lower maintenance costs.

Figure 1:
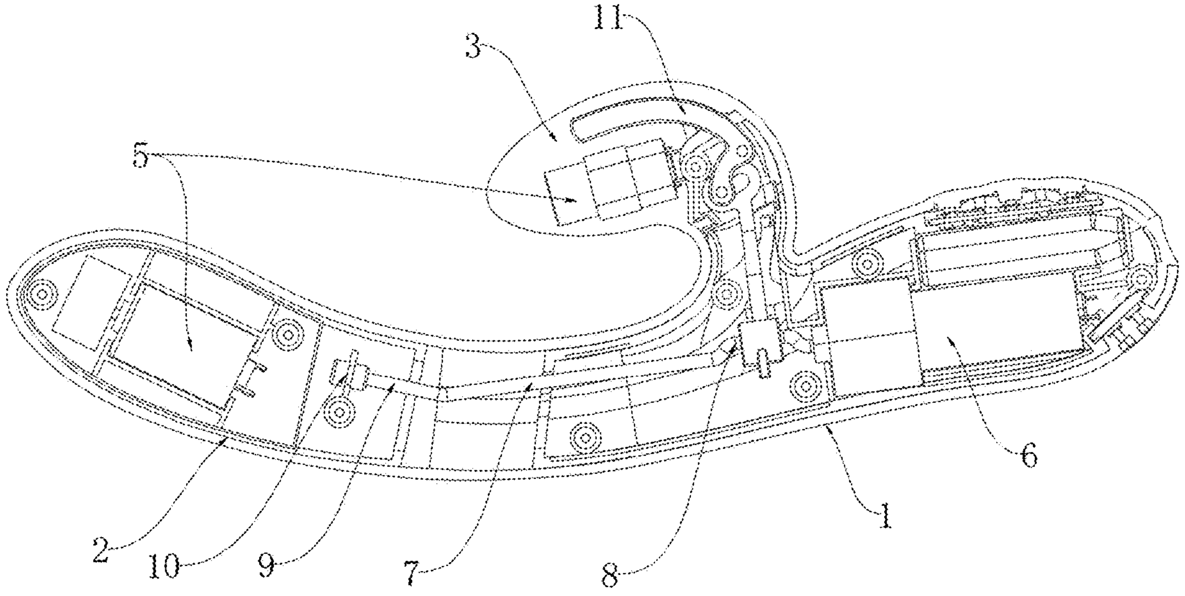
FIG. 1 is a schematic diagram of the internal structure of the first embodiment of the present disclosure.

Reference numbers: 1, fixed part; 2, first massage part; 3, second massage part; 4, control switch; 5, vibration motor; 6, driving motor; 7, transmission shaft; 8, protruding part; 9, bent rod; 10, drive collar; 11, arc-shaped toggle plate; 12, reciprocating push rod; 13, limiting slide bar; 14, slide groove; 15, limiting shaft; 16, drive groove; 17, rotating member; 18, eccentric post; 19, swing rod; 20, swing groove; 21, control board; 22, battery; 23, slider; 24, L-shaped push rod.

DESCRIPTION OF EMBODIMENTS

The technical solutions according to the embodiments of the present disclosure will be described clearly and fully in combination with the drawings according to the embodiments of the present disclosure. Obviously, the described embodiments are not all embodiments of the present disclosure, but only part of the embodiments of the present disclosure. Based on the disclosed embodiments, all other embodiments obtained by those skilled in the art without creative work fall into the scope of this disclosure.

Embodiment 1

Referring to FIGS. 1 to 4, a massager with multiple massage modes includes a fixed part 1, and further includes a first massage part 2 that is arranged at the front end of the fixed part 1 and a second massage part 3 that is arranged at the side of the fixed part 1. A driving assembly is arranged inside the fixed part 1, and the driving assembly is used to drive the first massage part 2 and the second massage part 3 to simultaneously move.

The driving assembly includes a driving motor 6, a first transmission component and a second transmission component. The driving motor 6 drives the first massage part 2 to move through the first transmission component, and the driving motor 6 drives the second massage part 3 to move through the second transmission component.

In the present disclosure, the driving motor 6 drives the first massage part 2 to move through the first transmission component, and the driving motor 6 can also simultaneously drive the second massage part 3 to swing through the second transmission component. In particular, while the driving motor 6 drives the first massage part 2 to move, it can also synchronously drive the second massage part 3 to perform a reciprocating swinging motion. Compared with the prior art, the two massage modes are carried out simultaneously, which is more suitable for practical user needs. Therefore, the massager of the present disclosure has stronger adaptability. Moreover, it features a simple structure, compact size, and is less prone to damage, with lower maintenance costs.

Compared with the traditional existing technologies, the significant advantages of the massager of the present disclosure are highlighted. Conventional massagers typically can only achieve a single massage mode. However, the massager of the present disclosure has successfully overcome this limitation. It can achieve the stable movement of the first massage part 2 driven by the driving motor 6 while simultaneously driving the second massage part 3 to perform an efficient reciprocating swinging motion. The coordinated operation of these two massage modes provides all-around and multi-level deep stimulation to the body's muscles and acupoints, greatly enhancing the overall effectiveness of the massage and meeting the diverse practical user needs.

From an overall structural perspective, the massager of the present disclosure has a simple structure while achieving powerful functions. The various components are assembled compactly and reasonably, without excessive complex connections or redundant structures, making the entire massager small in size and portable, and reducing the risk of component damage due to structural complexity. Even if a malfunction occurs, its simple structure makes the maintenance process relatively easy, effectively controlling repair costs. This, in turn, further enhances the product's cost-effectiveness and market competitiveness.

Figure 2:
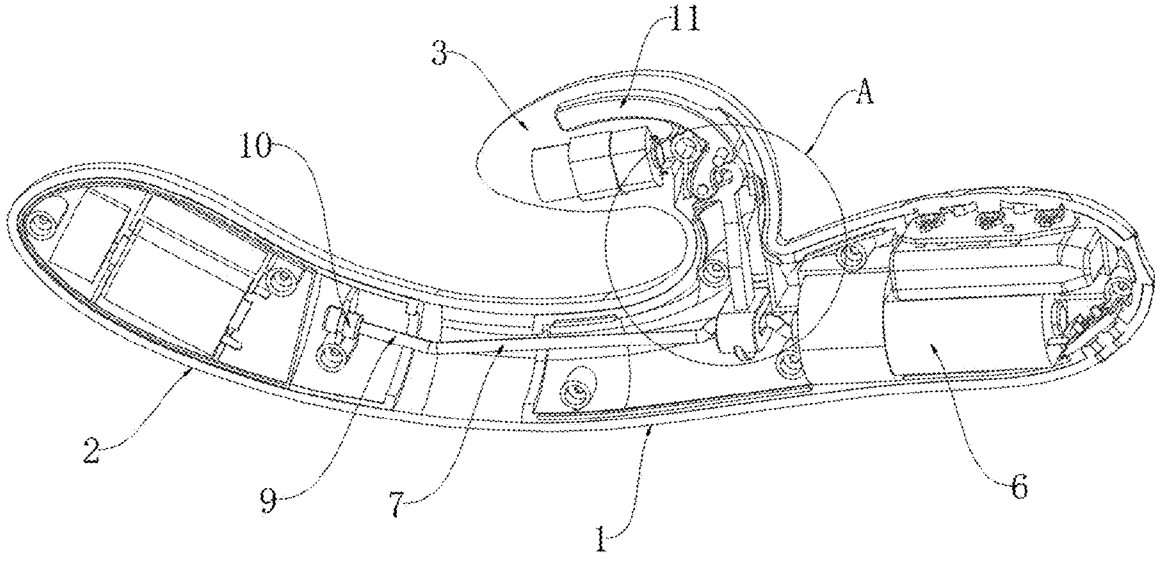
FIG. 2 is a schematic diagram of the structure of the bent rod in the first embodiment of the present disclosure.
Figure 3:
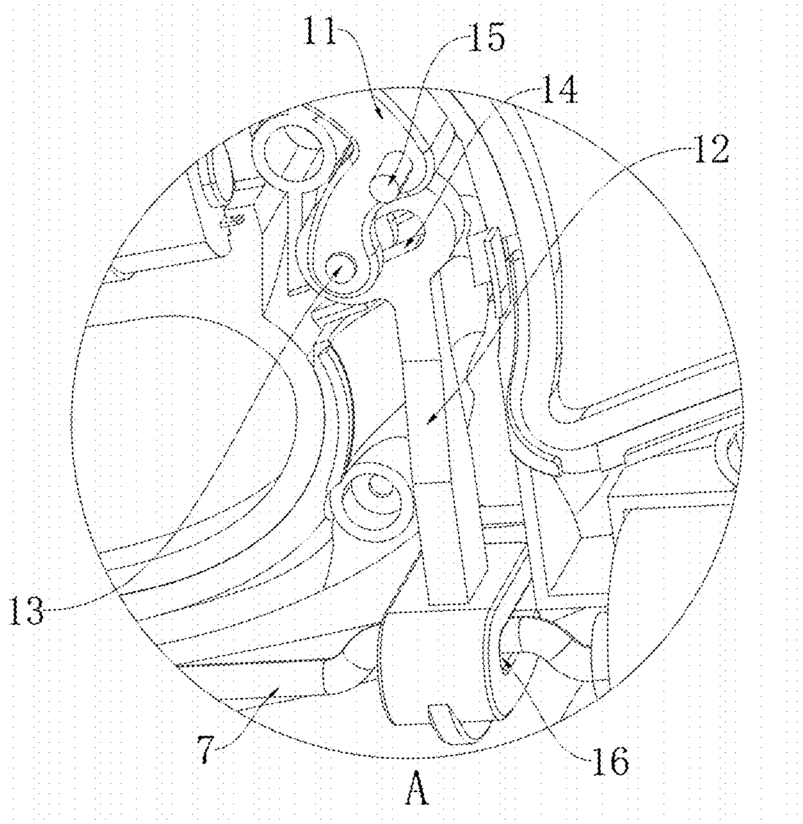
FIG. 3 is an enlarged view of point A in FIG. 2.
Figure 4:
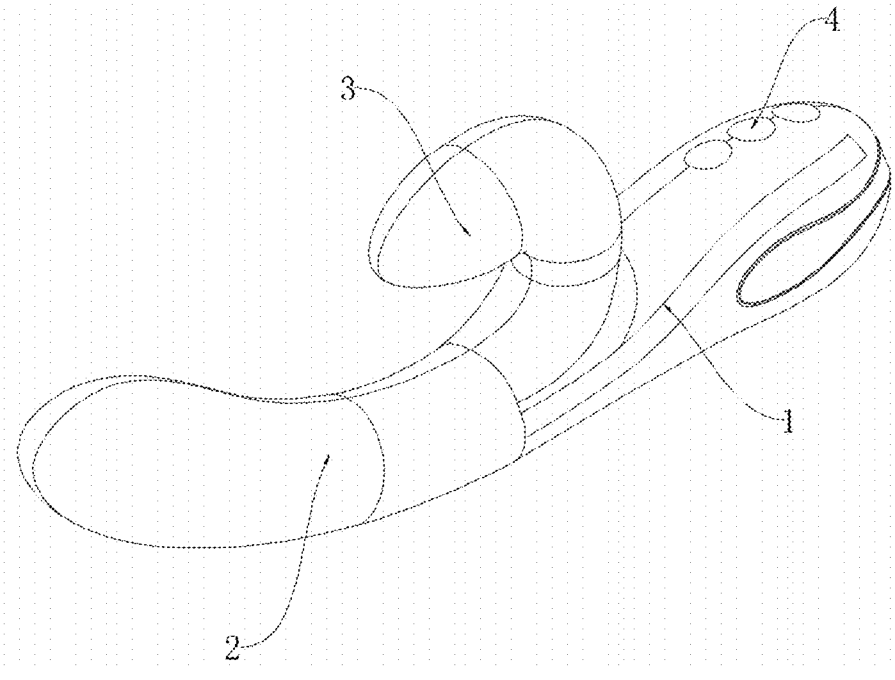
FIG. 4 is a schematic diagram of the overall structure of the first embodiment of the present disclosure.

Referring to FIGS. 2 and 3, the first massage part 2 and the second massage part 3 are each provided with a vibration motor 5. The outer walls of the fixed part 1, the first massage part 2 and the second massage part 3 are all wrapped with flexible protective covers. The first transmission component includes a transmission shaft 7, one end of which is in transmission connection with the output end of the driving motor 6. A control switch 4 is provided on the top of the fixed part 1. A bent rod 9 is provided at the front end of the transmission shaft 7. A drive collar 10 is provided inside the first massage part 2. The bent rod 9 extends to the inside of the drive collar 10, and the end of the bent rod 9 away from the transmission shaft 7 is structurally matched with the drive collar 10. The driving motor 6 is located inside the fixed part 1. The vibration motors 5 in the first massage part 2 and the second massage part 3 can further enhance the massage effect. The fixed part 1 and the first massage part 2 are movably connected through the flexible protective cover.

It should be noted that when the driving motor 6 is activated, the drive collar 10 is driven to move through the bent rod 9. Since the bent rod 9 is bent relative to the transmission shaft 7, when the transmission shaft 7 rotates, the motion trajectory of the end of the bent rod 9 follows a circular path. This motion drives the drive collar 10 to perform a circular motion, which in turn drives the flexible first massage part 2 to rotate and swing, so as to achieve the effect of swing massage.

It should be noted that in actual use, as the transmission shaft 7 rotates, the reciprocating push rod 12 can serve as a transmission mechanism to transfer the power of the transmission shaft 7 to the limiting slide bar 13. As a result, the reciprocating push rod 12 will move along with the reciprocating swing motion of the arc-shaped toggle plate 11.

Referring to FIGS. 1 to 4, the second transmission component includes a protruding part 8 and an arc-shaped toggle plate 11. The protruding part 8 is arranged on the side of the transmission shaft 7 close to the driving motor 6. The arc-shaped toggle plate 11 is arranged inside the second massage part 3. A limiting shaft 15 is arranged in the middle of the arc-shaped toggle plate 11. The arc-shaped toggle plate 11 is rotatably connected to the inner wall of the fixed part 1 through the limiting shaft 15. A limiting slide bar 13 is arranged at the bottom of the arc-shaped toggle plate 11. A reciprocating push rod 12 is arranged inside the fixed part 1. A slide groove 14 is opened at the top of the reciprocating push rod 12. The limiting slide bar 13 is located in the slide groove 14, and slidably fitted with the slide groove 14. A drive groove 16 is opened at the bottom of the reciprocating push rod 12, and the slide groove 14 and the drive groove 16 are arranged at a 90° angle to each other. The protruding part 8 passes through the drive groove 16, and the protruding part 8 is slidably fitted with the drive groove 16.

In this embodiment, the driving motor 6 is used to drive the first massage part 2 to perform swing massage in a 360° circular motion with the transmission shaft 7 as the center. It is worth mentioning that when the driving motor 6 drives the first massage part 2 to perform rotational swing massage, it can also drive the reciprocating push rod 12 to move up and down through the protruding part 8. Since the limiting slide bar 13 is slidably fitted with the slide groove 14, the limiting slide bar 13 can be driven to move. Furthermore, since the arc-shaped toggle plate 11 is rotatably connected to the inner wall of the fixed part 1 through the limiting shaft 15, as the limiting slide bar 13 is reciprocally driven, it causes the arc-shaped toggle plate 11 to perform reciprocating rotation around the limiting shaft 15 as the center, thereby driving the second massage part 3 to perform reciprocating swing and achieving the effect of reciprocating swing massage. This massage mode can also be applied in the field of female adult massage. For example, the first massage part 2 can be placed in the female's vagina to perform rotational swing massage on the female's vagina, while the second massage part 3 can be fitted with the female's clitoris, and the female's clitoris can be massaged and stimulated by the reciprocating swing of the second massage part 3.

Embodiment 2

Figure 5:
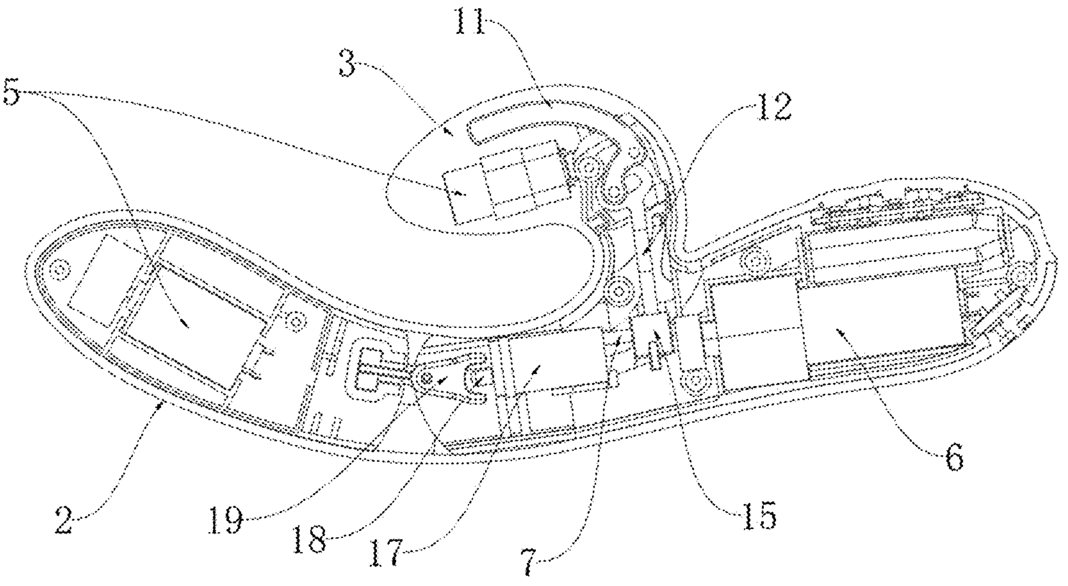
FIG. 5 is a schematic diagram of the overall structure of the second embodiment of the present disclosure.
Figure 6:
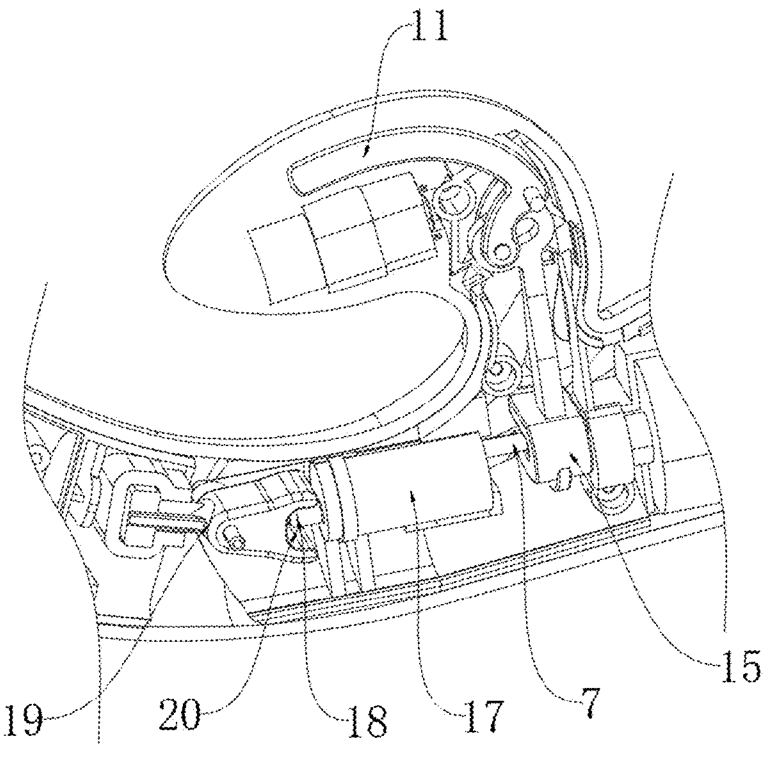
FIG. 6 is a schematic diagram of part of the structure in the second embodiment of the present disclosure.

Referring to FIGS. 5 and 6, the second embodiment differs from the first embodiment in that a rotating member 17 is rotatably connected in the fixed part 1, with the center of the rotating member 17 in transmission connection with the transmission shaft 7. A swing rod 19 is rotatably connected to an end of the fixed part 1 close to the first massage part 2. An eccentric post 18 is eccentrically arranged at one end of the rotating member 17 away from the transmission shaft 7. An end of the swing rod 19 close to the rotating member 17 defines a swing groove 20 that structurally matched with the eccentric post 18. An end of the swing rod 19 away from the fixed part 1 is fixedly connected to the first massage part 2, and the first massage part 2 is rotatably connected to the fixed part 1 through the swing rod 19.

It should be noted that the driving motor 6 drives the rotating member 17 to rotate through the transmission shaft 7, and thus drives the eccentric post 18 to rotate. The eccentric post 18 is located within the swing groove 20. Since the eccentric post 18 is structurally matched with the swing groove 20, it can drive the swing rod 19 to swing back and forth, thereby driving the first massage part 2 as a whole to perform an up-and-down swing massage. At the same time, the driving motor 6 can also synchronously drive the second massage part 3 as a whole to perform an up-and-down swing massage. In the first embodiment, the first massage part 2 performs a rotational swing massage, and the second massage part 3 performs a reciprocating swing massage. The massage modes of the two embodiments are different and users can choose according to actual need.

In this embodiment, the driving motor 6 is used to drive the first massage part 2 to perform an up-and-down swing massage through the swing rod 19.

It should be noted that the above massage mode can also be applied in the field of female adult massage. For example, the first massage part 2 can be placed in the female's vagina, and the second massage part 3 can fit the female's clitoris. The female's vagina and clitoris receive an up-and-down swing massage at the same time.

In the operating mechanism of the massager, the driving motor 6 plays a central role in power transmission. When the driving motor 6 is activated, the power generated by it is stably and efficiently transmitted to the rotating member 17 through the transmission shaft 7, causing the rotating member 17 to start rotating. The rotation of the rotating member 17 further drives the eccentric post 18 connected thereto to rotate together.

The eccentric post 18 is arranged within the swing groove 20 and the two fit closely. Since the center of the eccentric post 18 does not coincide with its axis of rotation, the continuous rotation of the eccentric post 18, guided and constrained by the swing groove 20, is converted into a driving force for the swing rod 19, successfully driving the swing rod 19 to perform regular reciprocating swings. The reciprocating swing of the swing rod 19 then drives the first massage part 2 as a whole to perform up-and-down swing massage. In this process, the massage intensity and rhythm are precisely controlled through the precise cooperation of the various components, enabling effective deep massage stimulation of specific areas of the body, thereby alleviating muscle tension and fatigue.

It is worth mentioning that the design of this massager is highly flexible. While the driving motor 6 drives the first massage part 2 to perform an up-and-down swing massage, it also has the ability to synchronously drive the second massage part 3 to perform the same up-and-down swing massage. Compared with the first embodiment in which the first massage part 2 employs a rotational swing massage mode and the second massage part 3 adopts a reciprocating swing massage mode, the massage modes of the two embodiments each have its own unique benefits. Users can freely choose different massage modes based on their physical condition, personal preferences, and actual massage needs. This ensures the most suitable massage experience, fully meeting diverse usage scenarios and personalized requirements.

Embodiment 3

Figure 7:
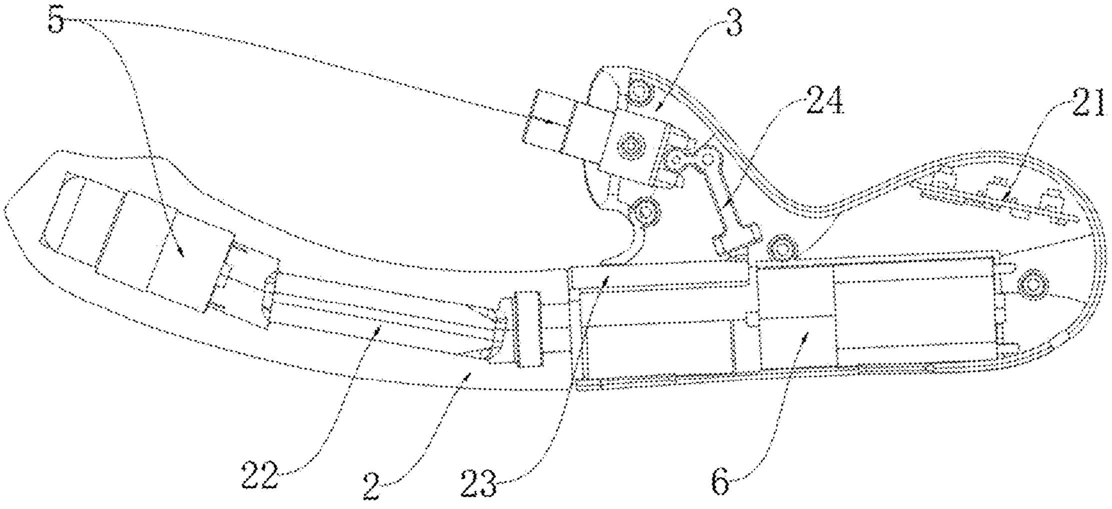
FIG. 7 is a schematic diagram of the overall structure of the third embodiment of the present disclosure.

Referring to FIG. 7, the third embodiment differs from the first and second embodiments in that a battery 22 is provided in the first massage part 2, and a slider 23 is slidably connected in the fixed part 1. One end of the slider 23 is connected to the driving motor 6, and the other end of the slider 23 is fixedly connected to the first massage part 2. The slider 23 is in transmission connection with the driving motor 6, and the driving motor 6 is used to drive the slider 23 to move back and forth. A control board 21 for controlling the driving motor 6 is provided in the fixed part 1, the battery 22 is used to supply power to the driving motor 6, and the control board 21 is used to control the rotation mode of the driving motor 6.

An L-shaped push rod 24 is rotatably connected in the second massage part 3. The bottom of the L-shaped push rod 24 is hinged to one end of the slider 23, and the top of the L-shaped push rod 24 is connected to the vibration motor 5 in the second massage part 3.

The driving motor 6 drives the slider 23 to move back and forth horizontally (the motor driving the slider 23 to move back and forth is existing technology and is not fully shown in the figure), thereby driving the first massage part 2 to move left and right relative to the fixed part 1, and thus enabling the first massage part 2 to perform telescopic massage. At the same time, the second massage part 3 can be driven to perform swing massage through the L-shaped push rod 24. The vibration motors 5 in the first massage part 2 and the second massage part 3 can further enhance the massage effect. Therefore, the massage mode of this embodiment is different from those of the first and second embodiments. Users can choose different massage modes based on their actual massage needs. In this embodiment, the driving motor 6 is used to perform massage in a way of moving back and forth in a telescopic manner.

The above massage mode can also be applied in the field of female adult massage. For example, the first massage part 2 can be placed in the female's vagina to perform a telescopic massage on the female vagina, while the second massage part 3 can fit the female's clitoris to perform an up-and-down swing massage.

It should be noted that relational terms such as "first" and "second" in this disclosure are merely used to distinguish one entity or operation from another and do not necessarily require or imply any actual relationship or order between these entities or operations. Furthermore, the terms "include," "comprise," or any of their variations are intended to cover a non-exclusive inclusion, so that a process, method, item, or device that includes a list of elements not only includes those elements but may also include other elements not explicitly listed or elements inherent to such a process, method, item, or device.

Although embodiments of the present disclosure have been illustrated and described, it will be understood by those skilled in the art that various changes, modifications, substitutions, and alterations can be made to these embodiments without departing from the principles and spirit of the disclosure. The scope of the present disclosure is defined by the appended claims and their equivalents.

The invention claimed is:

1. A massager with multiple massage modes, comprising a fixed part (1), wherein the massager further comprises:

a first massage part (2) arranged at a front end of the fixed part (1), and a second massage part (3) arranged at a lateral side of the fixed part (1), wherein both the first massage part (2) and the second massage part (3) extend towards a front direction, each of the first massage part (2) and the second massage part (3) has a length measured in the front direction, and the length of the first massage part (2) is greater than the length of the second massage part (3);

wherein a driving assembly is arranged inside the fixed part (1) for driving the first massage part (2) and the second massage part (3) to simultaneously move or stop;

wherein the driving assembly comprises a driving motor (6), a first transmission component and a second transmission component, and the driving motor (6) is configured to drive the first massage part (2) to move via the first transmission component and drive the second massage part (3) to move via the second transmission component;

wherein the first massage part (2) is configured for inserting into a vagina or anus of a user via an entrance for massage, and the second massage part (3) is configured for external massage at an area of the user adjacent to the entrance; and wherein the first massage part (2) is configured to perform any one of the following: a swing massage in a 360° circular motion, an up-and-down swing massage, and a telescopic massage in a forward and backward manner; and the second massage part (3) is configured to swing towards or away from the fixed part (1) and the entrance of the vagina or anus of the user.

2. The massager with multiple massage modes of claim 1, wherein each of the first massage part (2) and the second massage part (3) is provided with a vibration motor (5).

3. The massager with multiple massage modes of claim 2, wherein outer walls of the fixed part (1), the first massage part (2) and the second massage part (3) are all wrapped with flexible protective covers.

4. The massager with multiple massage modes of claim 3, wherein a slider (23) is slidably connected inside the fixed part (1), one end of the slider (23) is connected to the driving motor (6), an other end of the slider (23) is fixedly connected to the first massage part (2), the slider (23) is in transmission connection with the driving motor (6), the driving motor (6) is configured to drive the slider (23) to move back and forth, and a control board (21) for controlling the driving motor (6) is provided inside the fixed part (1).

5. The massager with multiple massage modes of claim 4, wherein an L-shaped push rod (24) is rotatably connected inside the second massage part (3), a bottom of the L-shaped push rod (24) is hinged to one end of the slider (23), and a top of the L-shaped push rod (24) is connected to the vibration motor (5) in the second massage part (3).

6. The massager with multiple massage modes of claim 5, wherein the driving motor (6) is configured to drive the first massage part (2) to perform the telescopic massage in the forward and backward manner.

7. The massager with multiple massage modes of claim 2, wherein the first transmission component comprises a transmission shaft (7), and one end of the transmission shaft (7) is in transmission connection with an output end of the driving motor (6).

8. The massager with multiple massage modes of claim 7, wherein a bent rod (9) is provided at a front end of the transmission shaft (7), a drive collar (10) is provided inside the first massage part (2), the bent rod (9) extends into an inside of the drive collar (10), and an end of the bent rod (9) away from the transmission shaft (7) is structurally matched with the drive collar (10).

9. The massager with multiple massage modes of claim 8, wherein the second massage part (3) is located at an end of the fixed part (1) away from the first massage part (2).

10. The massager with multiple massage modes of claim 9, wherein the second transmission component comprises a protruding part (8) and an arc-shaped toggle plate (11), the protruding part (8) is arranged on a side of the transmission shaft (7) close to the driving motor (6), the arc-shaped toggle plate (11) is arranged inside the second massage part (3), a limiting shaft (15) is arranged in a middle of the arc-shaped toggle plate (11), the arc-shaped toggle plate (11) is rotatably connected to an inner wall of the fixed part (1) through the limiting shaft (15), and a limiting slide bar (13) is arranged at a bottom of the arc-shaped toggle plate (11).

11. The massager with multiple massage modes of claim 10, wherein a reciprocating push rod (12) is arranged inside the fixed part (1), a slide groove (14) is opened on a top of the reciprocating push rod (12), the limiting slide bar (13) is located in the slide groove (14), and the limiting slide bar (13) is slidably engaged with the slide groove (14).

12. The massager with multiple massage modes of claim 11, wherein a drive groove (16) is opened on a bottom of the reciprocating push rod (12), the slide groove (14) and the drive groove (16) are arranged at an angle of 90° to each other, the protruding part (8) passes through the drive groove (16), and the protruding part (8) is slidably engaged with the drive groove (16).

13. The massager with multiple massage modes of claim 12, wherein the driving motor (6) is configured to drive the first massage part (2) to perform the swing massage in the 360° circular motion with the transmission shaft (7) as a center.

14. The massager with multiple massage modes of claim 7, wherein a rotating member (17) is rotatably connected inside the fixed part (1), a center of the rotating member (17) is in transmission connection with the transmission shaft (7), and a swing rod (19) is rotatably connected to an end of the fixed part (1) close to the first massage part (2).

15. The massager with multiple massage modes of claim 14, wherein an eccentric post (18) is eccentrically arranged at an end of the rotating member (17) away from the transmission shaft (7), a swing groove (20) structurally matching with the eccentric post (18) is opened at an end of the swing rod (19) close to the rotating member (17), and an end of the swing rod (19) away from the fixed part (1) is fixedly connected to the first massage part (2).

16. The massager with multiple massage modes of claim 15, wherein the driving motor (6) is configured to drive the first massage part (2) to perform the up-and-down swing massage through the swing rod (19).

17. The massager with multiple massage modes of claim 1, wherein an axial end of the driving assembly is configured to drive the first massage part (2) to move, and a lateral end of the driving assembly is configured to drive the second massage part (3) to move.

18. A massager with multiple massage modes, comprising a fixed part (1), wherein the massager further comprises a first massage part (2) arranged at a front end of the fixed part (1), and a second massage part (3) arranged at a side of the fixed part (1);

wherein a driving assembly for driving the first massage part (2) and the second massage part (3) to simultaneously move is arranged inside the fixed part (1);

wherein the driving assembly comprises a driving motor (6), a first transmission component and a second transmission component, and the driving motor (6) is configured to drive the first massage part (2) to move via the first transmission component and drive the second massage part (3) to move via the second transmission component;

wherein the first massage part (2) is configured for inserting into a vagina or anus for massage, and the second massage part (3) is configured for external massage;

wherein each of the first massage part (2) and the second massage part (3) is provided with a vibration motor (5);

wherein the first transmission component comprises a transmission shaft (7), and one end of the transmission shaft (7) is in transmission connection with an output end of the driving motor (6); and wherein a bent rod (9) is provided at a front end of the transmission shaft (7), a drive collar (10) is provided inside the first massage part (2), the bent rod (9) extends into an inside of the drive collar (10), an end of the bent rod (9) away from the transmission shaft (7) is structurally matched with the drive collar (10), and the driving motor (6) is located inside the fixed part (1).

19. A massager with multiple massage modes, comprising a fixed part (1), wherein the massager further comprises a first massage part (2) arranged at a front end of the fixed part (1), and a second massage part (3) arranged at a side of the fixed part (1);

wherein a driving assembly for driving the first massage part (2) and the second massage part (3) to simultaneously move is arranged inside the fixed part (1);

wherein the driving assembly comprises a driving motor (6), a first transmission component and a second transmission component, and the driving motor (6) is configured to drive the first massage part (2) to move via the first transmission component and drive the second massage part (3) to move via the second transmission component;

wherein the first massage part (2) is configured for inserting into a vagina or anus for massage, and the second massage part (3) is configured for external massage;

wherein each of the first massage part (2) and the second massage part (3) is provided with a vibration motor (5);

wherein outer walls of the fixed part (1), the first massage part (2) and the second massage part (3) are all wrapped with flexible protective covers; and wherein a slider (23) is slidably connected inside the fixed part (1), one end of the slider (23) is connected to the driving motor (6), an other end of the slider (23) is fixedly connected to the first massage part (2), the slider (23) is in transmission connection with the driving motor (6), the driving motor (6) is configured to drive the slider (23) to move back and forth, and a control board (21) for controlling the driving motor (6) is provided inside the fixed part (1).

* * * * *